United States Patent Office 3,678,003
Patented July 18, 1972

3,678,003
ROOM TEMPERATURE VULCANIZABLE
SILICONE ELASTOMER STOCKS
Wolfgang Kaiser, Adrian, Mich., and Siegfried Nitzsche,
Ernst Wohlfarth, and Paul Hittmair, Burghausen,
Upper Bavaria, Germany, assignors to Wacker-Chemie
G.m.b.H., Munich, Germany
No Drawing. Filed Dec. 17, 1970, Ser. No. 99,256
Claims priority, application Germany, Dec. 23, 1969,
P 19 64 502.4
Int. Cl. C08f 11/04
U.S. Cl. 260—46.5 G
11 Claims

ABSTRACT OF THE DISCLOSURE

A room temperature vulcanizable silicone rubber stock is prepared by admixing and storing in the substantial absence of moisture (1) an essentially linear oganosiloxane polymer having chemically reactive end groups with (2) a crosslinking organosilicon compound containing at least three hydrolyzable groups per molecule, at least some of the hydrolyzable groups being amino groups bonded to silicon through Si—N linkage and any remaining hydrolyzable groups are oxime groups, and (3) a silane containing at least one amino substituent bonded to silicon over one or more carbon atoms and at least one monovalent hydrocarbonoxy radical or substituted hydrocarbonoxy radical bonded to silicon over an Si—O—C linkage, any substituents in said radical being amino or alkoxy groups. Fillers and curing catalysts are optionally present. The products exhibit greatly improved adhesion to a wide variety of substrates when compared to previously known RTV silicone rubber stocks.

---

This invention relates to a novel room-temperature vulcanizing (RTV) silicone rubber stock containing as an additive a silane containing in each molecule both 1 to 3 amino groups bonded to silicon across carbon and 1 to 3 hydrocarbonoxy, aminohydrocarbonoxy, alkoxyhydrocarbonoxy or aminoalkoxyhydrocarbonoxy groups bonded to silicon via an Si—O—C linkage. The silicone rubber stocks of this invention are prepared and stored in the substantial absence of moisture, cure upon exposure to moisture at about room temperature or above and adhere tenaciously to a wide variety of substrates.

Room-temperature vulcanizing silicone rubber stocks are widely known in the art and have become very well known commercially as well. Many chemical cure systems are employed in compounding silicone rubber stocks and include both two-package systems wherein the materials are admixed just prior to use and the cure is spontaneous and one-package systems which are stored in the absence of moisture, oxygen or some other material which acts to bring about the desired chemical reaction which is essentially a crosslinking reaction.

Among the one-package or one-component RTV silicone rubber stocks previously known are those stocks which cure to elastomers at room temperature upon exposure to moisture and can be stored for extended periods of time in the absence of moisture based on diorganopolysiloxanes containing reactive end groups admixed with silicon compounds containing in each molecule at least three (3) amino groups bonded to silicon through Si—N linkages. Such RTV silicone rubber stocks are exemplified and fully disclosed in the art and reference can be made to U.S. Pats. Nos. 3,032,528 issued May 1, 1962, and 3,464,951 issued Sept. 2, 1969, both specifically incorporated herein by reference.

According to the pending U.S. patent application Ser. No. 63,608 filed Aug. 13, 1970, a portion of the amino groups bonded to silicon through Si—N linkages, as set forth in the preceding paragraph, can be replaced by oxime groups (—ON=X, where X is =CR"$_2$ or

as defined below).

The adhesion improving additive of the present invention provides a totally unexpected and unpredictable improvement in the adhesion to a wide variety of substrates of the compositions described generally in the preceding two paragraphs and specifically in the applications and patents mentioned therein and incorporated herein by specific reference thereto. When compared to previously known adhesion improving additives containing isocyanate, mercapto and/or hydroxyl groups as the organofunctional group, for example, as shown in U.S. Pat. No. 3,453,243 issued July 1, 1969, and Canadian Pat. No. 774,654 issued Dec. 26, 1967, the present additives show greatly improved adhesion of the RTV silicone rubber to a wide variety of substrates and also do not affect the storage stability of the RTV silicone rubber stocks.

It is the object of this invention to introduce a novel silicone rubber stock exhibiting excellent adhesion to a variety of substrates. A novel RTV silicone rubber stock is also an object of this invention. Other objects and advantages of this invention are detailed in or will be apparent from the disclosure and claims which follow.

This invention is directed to a silicone rubber stock prepared in the substantial absence of water and curable to an elastomer upon exposure to water consisting essentially of (1) an essentially linear diorganopolysiloxane having chemically reactive endblockers, (2) crosslinking silicon compounds containing at least three hydrolyzable groups per molecule, said hydrolyzable groups being amino groups bonded to silicon through SiN bonding or such amino groups and oxime groups, and (3) one or more silanes containing in each molecule at least one amino group bonded to silicon through Si—C bonding and at least one hydrocarbonoxy, aminohydrocarbonoxy, alkoxyhydrocarbonoxy or aminoalkoxyhydrocarbonoxy radical bonded to silicon through SiO linkage.

The ingredients (1) and (2) are well known in the art and are further described below. The unique ingredient is the silane (3) containing both amino groups bonded through SiC and hydrocarbonoxy or certain substituted hydrocarbonoxy radicals bonded to silicon through oxygen. The preferred silanes (3) are defined by the general Formula I {R"$_2$N(CH$_2$)$_m$Z$_n$(CH$_2$)$_p$}$_a$Si(OR')$_b$R$_{4-a-b}$ where each R is a hydrocarbon radical, halogenohydrocarbon radical or cyanohydrocarbon radical, each R' is a hydrocarbon radical, alkoxy hydrocarbon radical, aminohydrocarbon radical or alkoxyaminohydrocarbon radical, each R" is hydrogen or a hydrocarbon radical, Z is oxygen or NR" where R" is as above defined, a and b are each 1, 2 or 3 and the sum of a+b is 2, 3 or 4, m is 1 to 10, preferably 2, n is 0 or 1, and p is 1 to 10, preferably 3. It is noted the substituents bonded to silicon other than the amino groups bonded to silicon through carbon and hydrocarbon or substituted hydrocarbon radicals bonded to silicon through oxygen are represented by R.

The organic radicals bonded to silicon and represented by R include monovalent hydrocarbon radicals of 1 to 18 carbon atoms, halogenated monovalent hydrocarbon radicals of 1 to 18 carbon atoms and cyanohydrocarbon radicals of 1 to 18 carbon atoms as these terms are generally accepted in the silicone art. Thus, R represents alkyl radicals from methyl to octadecyl; alkenyl radicals from vinyl to octadecenyl; cycloaliphatic hydrocarbon radicals such as cyclopentyl, cyclohexyl, methylcyclohexyl, cyclohexenyl and cyclooctadecenyl radicals; aryl radicals such as phenyl and xenyl; aralkyl radicals such as benzyl and beta-phenylethyl and beta-phenylpropyl; as well as alkaryl radicals such as tolyl, ethylphenyl and propylphenyl radicals. Halogenated derivatives of the foregoing hydrocarbon radicals can also be present such as chloromethyl, perfluorovinyl, chlorobromocyclopentyl, iodobenzyl, chlorophenyl and 3,3,3-trifluoropropyl radicals. The cyano-substituted hydrocarbon radicals are most usually cyanoalkyl radicals such as beta-cyanoethyl. The most commonly available and, therefore, preferred radicals represented by R are alkyl radicals, particularly methyl, the phenyl radicals and vinyl radicals and at least 50 percent of the R groups are methyl radicals.

The R' radicals bonded to silicon through oxygen (i.e. ≡SiOR') include all of the monovalent hydrocarbon radicals set forth above in defining the R substituents, but preferably the R' radicals contain less than 7 carbon atoms. R' also represents substituted hydrocarbon radicals wherein the substituents are amino radicals, alkoxy radicals or both. The substituted hydrocarbon radicals represented by R' can be illustrated by aminoalkyl radicals such as beta-aminoethyl and gamma-aminobutyl as well as amino-substituted alkyl, aryl, aralkyl, alkaryl, alkenyl and cycloaliphatic radicals, and by alkoxyalkyl radicals such as beta- methoxyethyl, gamma-ethoxypropyl and alkoxy substituted alkyl, aryl, aralkyl, alkaryl, alkenyl and cycloaliphatic radicals.

The R'' radicals are hydrogen atoms or monovalent hydrocarbon radicals as this latter term is defined and exemplified for R above (i.e. alkyl, aryl, aralkyl, alkaryl, alkenyl and cycloaliphatic hydrocarbon radicals of 1 to 18, preferably 1 to 6, carbon atoms).

Examples of the operable silanes of general Formula I include $(CH_3)\{H_2N(CH_2)_2O\}_2Si(CH_2)_3O(CH_2)_2NH_2$, $(CH_3O)_3Si(CH_2)_3NHCH_2CH_2NH_2$ $H_2N(CH_2)_2O(CH_2)_3Si(OCH_2CH_2NH_2)_3$ $H_2NCH_2CH_2O(CH_2)_3Si(OC_2H_5)_3$, N - beta-aminoethyl-delta-aminobutyltriethoxysilane, gamma-aminopropyltriethoxysilane, aminomethyltrimethoxysilane, N - beta-aminoethyl-gamma-aminopropyl - tris - (methoxyethoxy) silane and delta-aminobutyltriethoxysilane.

Mixtures of the various silanes (3) containing at least one amino group bonded to silicon across carbon and at least one monovalent hydrocarbon radical bonded to silicon across oxygen as described above can be employed.

In order to attain a high degree of adhesion of the cured silicone rubber stock to the substrate, the silanes (3) are employed in amounts of from 0.1 to 10 percent by weight based on the total weight of ingredients (1), (2) and (3) and best results are achieved employing 0.1 to 5 percent by weight of silane (3) on the stated basis. Below 0.1 percent by weight, the improvement in adhesion is not realized and above 10 percent by weight no further improvement is realized, hence, the added costs are unjustified and may even result in loss of other desired physical properties.

The silane (3) is employed as an additive to the defined RTV silicone rubber stock and not as a primer applied to the substrate prior to application of the RTV silicone rubber stock. The silanes (3) are admixed with the base diorganosiloxane polymer (1) and polyfunctional silicon compound containing in each molecule at least three amino groups bonded to silicon through SiN or at least three such amino groups and oxime groups, at any desired point during preparation of the RTV silicone rubber stock. The preferred mixing procedure is to add silane (3) to the base polymer (1) and thoroughly disperse it therein then add the crosslinker (2) and any condensation catalyst which may be used.

The base siloxane polymers employed herein are well known in the RTV silicone rubber art and are essentially linear diorganopolysiloxanes having reactive endblockers which are usually alkoxy or hydroxy groups. The most generally employed organopolysiloxanes are alpha, omega-hydroxy diorganopolysiloxanes defined by the general formula

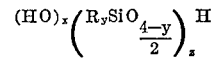

where R is as above defined and exemplified, x has an average value of 0.99 to 1.01, y has an average value of 1.99 to 2.01, the sum of x+y is 3.0 and z is a whole number of at least 3 and preferably in the range from 50 to 2500 although very high molecular weight gum-like polymers can be used if desired. In addition to the hydroxyl endblockers, the reactive groups on the base siloxane polymer (1) can be —NR''$_2$ where R'' is as above defined, oxime groups, hydrogen atoms, alkoxy radicals and alkoxyalkoxy radicals. It is noted the average values for x and y permit the presence of small proportions (i.e. usually a total of less than 2 mol percent) of $SiO_2$, $RSiO_{3/2}$ and $R_3SiO_{1/2}$ units but it is preferred to employ linear polymers of $R_2SiO$ units.

In the base siloxane polymers, the preferred organic substituents because of price, availability and performance,, are methyl, phenyl, vinyl and 3,3,3-trifluoropropyl radicals and at least 50 percent of the organic substituents represented by R in the base polymer (1) should be methyl radicals. The operable siloxane polymers (1) can be homopolymers, copolymers and mixtures thereof. Preferred viscosities for the base polymer (1) range from 100 to 500,000 cs. at 25° C.

The crosslinking polyfunctional organosilicon compound (2) contains at least three hydrolyzable groups per molecule and can be a silane or a relatively low molecular weight siloxane (e.g. less than 10,000 cs. viscosity at 25° C.). At least a portion of the hydrolyzable groups present in organosilicon compound (2) consist of amino groups bonded to silicon via SiN bonding. The remaining hydrolyzable groups in organosilicon compound (2), if any, are oxime groups. These crosslinking organosilicon compounds (2) are known in the art and include (a) organosilicon compounds containing three or more amino groups bonded to silicon through SiN linkages as the only hydrolyzable groups in each molecule, (b) mixtures of the organosilicon compounds (a) with organosilicon compounds containing three or more oxime radicals as the only hydrolyzable groups in the molecule and (c) organosilicon compounds containing both the defined amino groups and the oxime groups, there being at least three of such hydrolyzable groups per molecule. Mixtures of (a), (b) and (c) can also be employed.

The crosslinking organosilicon compounds (2)(a) as defined above include silanes of the general Formula II, $R_cSi(NR''_2)_{4-c}$ where R and R'' are as above defined and c is 0 or 1, preferably 1, as well as oligomers produced by partial hydrolysis and condensation of such silanes. Preferably R'' does not include aliphatically unsaturated organic radicals such as vinyl and preferably at least one R'' is hydrogen. (See U.S. Pats. No. 3,032,528 and No. 3,464,951.)

The organosilicon compounds containing only oxime radicals as the hydrolyzable groups and useful in mixtures with the organosilicon compounds (2)(a) can be defined by the general Formula III $R_cSi(ON=X)_{4-c}$ where R and c are as above defined and X is

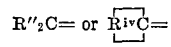

where $R^{iv}$ is a divalent hydrocarbon radical, as well as oligomers of such silanes. (For further details, see U.S. Pat. No. 3,189,576 issued June 15, 1965 and incorporated herein by specific reference thereto.)

The crosslinking organosilicon compound (2) containing both oxime and amino radicals can be illustrated by the general Formula IV $R_{4-d-e}Si(ON=X)_d(NR''_2)_e$ where R, R'' and X are as above defined, d and e are each 1, 2 or 3, the sum of d and e is 3 or 4. Oligomers prepared by partial hydrolysis and condensation of the defined silanes are also operable. These crosslinking agents (2)(c) are fully disclosed and defined in U.S. patent application Ser. No. 63,608 filed Aug. 13, 1970, and incorporated herein by specific reference thereto.

The methods of preparing the crosslinking organosilicon compounds (2) are well known in the art and include, inter alia, reacting the appropriate halogenosilane with a primary or secondary amine of the formula $HNR''_2$ in the presence of an acid acceptor, at room temperature, in an inert organic solvent and in the absence of moisture. These procedures are well known and do not require to be set forth in detail herein.

The crosslinking organosilicon compound (2) is employed in proportions such that there is a total of at least three hydrolyzable groups from compound (2) for each reactive end group present in the base diorganopolysiloxane (1). In general, the crosslinking organosilicon compound (2) is present in the total mixture of (1), (2) and (3) to the extent of 0.2 to 15 percent by weight and preferably 1 to 10 percent by weight.

In addition to the base siloxane polymer (1), the crosslinking agent (2) and the additive (3), the compositions of this invention may contain other additives known for use in silicone rubber formulations and particularly for RTV silicone rubber stocks. Such other materials include reinforcing and non-reinforcing fillers, molecular sieves, pigments, soluble dyes, organopolysiloxane resins, pure organic resins such as polyvinylchloride powders and polytetrafluoroethylene powders, corrosion inhibitors, aromatics, oxidation inhibitors, heat stabilizers, condensation catalysts such as those metal salts of carboxylic acids known for such use as illustrated by dibutyltindilaurate, dibutyl tin salts of aliphatic carboxylic acids branched in the alpha position to the carboxyl groups and containing 9 to 11 carbon atoms, and organosiloxytitanium compounds, as well as plasticizers and softeners such as fluid dimethylsiloxane polymers endblocked with trimethylsiloxy groups.

The organopolysiloxane base polymer (1) can contain alkenyl groups such as vinyl, allyl and cyclohexenyl and when such groups are present, it is often advantageous to incorporate 0.01 to 5 percent by weight, based on the weight of the base polymer (1), of any of the heat activated organic-peroxy compounds employed as curing catalysts in heat cured silicone rubber stocks.

The reinforcing fillers commonly employed in RTV silicone rubber stocks can be employed herein and can be exemplified by fume silica, silica aerogels, precipitated silicas and other high surface area fillers. The non-reinforcing fillers include quartz flour, diatomaceous earth, calcium silicate, zirconium silicate and calcium carbonate.

Fibrous fillers such as asbestos, glass fibers, organic fibers and metallic fibers and filaments can also be used. The fillers can be pretreated to display organosiloxy or alkoxy groups on their surface. Mixtures of fillers can often be used to advantage. Preferably, the fillers are used in quantities of 5 to 90 percent based on the total weight of the RTV silicone rubber stock.

The mixtures of this invention are prepared and can be stored for long periods of time in the absence of water. They will cure to elastomers at room temperature when exposed to water with the moisture in the atmosphere usually being sufficient to effect the desired vulcanization and cure. Higher temperatures than room temperature will generally accelerate the vulcanization but effective vulcanization occurs at temperatures as low as 5° C. Further, adding water to the area wherein the vulcanization is carried forward will accelerate the vulcanization and cure rate.

The elastomers of this invention adhere very solidly to a wide variety of substrates such as glass, porcelain, stone, concrete, mortar, aluminum, stainless steels, wood, paper, polystyrene, solid polyepoxides and synthetic resin lacquer coatings, even without the use of primers. Thus, these RTV silicone rubbers are widely useful not only for sealing joints and hollow areas such as in automobiles, boats, aircraft, spacecraft and other vehicles but also, for example, as adhesives or putties for preparing protective coatings, as adhesive or release coatings on paper and similar fibrous materials, for preparing electrical insulation for conductors and electronic equipment, and for preparing other articles in which the elastomers form a part of the assembly.

The following examples are included herein to illustrate the invention and they do not define, restrict or otherwise delineate the scope of the invention which is properly set forth in the claims. Any and all of the equivalent materials disclosed and described in the disclosure can be substituted for those specific ingredients employed in the examples with equivalent results. All parts and percentages are based on weight unless otherwise stated and all viscosities were measured at 25° C.

EXAMPLE 1

(a) A mixture weighing 100 g. was prepared in the absence of water employing 50 parts of hydroxyl endblocked dimethylpolysiloxane (48,000 cp.), 20 parts trimethylsiloxy endblocked dimethylpolysiloxane (500 cp.), 50 parts of calcium carbonate and 10 parts fume silica. To the above mixture there was added 0.5 gram of $CH_3Si\{O(CH_2)_2NH_2\}_2(CH_2)_3O(CH_2)_2NH_2$ (V) and 4.5 grams of methyltris(cyclohexylamino)silane. (Material A.)

(b) The procedure described in (a) above was repeated except that instead of 4.5 grams of methyltris(cyclohexylamino)silane, 4.5 grams of a mixture of 1 part methyltris(cyclohexylamino)silane and 2 parts of $$CH_3Si\{ON=C(CH_3)_2\}_3$$

and 0.05 g. of dibutyltindilaurate was used. (Material B.)

(c) For purposes of comparison, controls were prepared using the methods of (a) and (b) above except the silane defined by Formula V was omitted. (Materials Va and Vb.)

The materials A, B, Va and Vb were stored in the absence of water and remained essentially unchanged after six months of storage. Each of the materials cured to form a silicone elastomer when exposed to atmospheric moisture at room temperature.

The adhesion of the materials A, B, Va and Vb to various substrates was tested by employing the test method of the American Standard Association (ASA) No. 116.1, 1960 on a tear machine. The following results were obtained:

| Material | Adhesion in kg./cm.² on— | | | | |
| --- | --- | --- | --- | --- | --- |
|  | Stainless steel (V₂A) | Brass | Aluminum anodic oxidized | Sheet steel Cd coated | Polystyrene |
| A | 9.6 | 3.5 | 10.0 | 4.5 | 4.2 |
| B | 9.4 | 3.6 | 9.9 | 4.1 | 4.0 |
| Va | 2.8 | 1.5 | 2.5 | 1.7 | 0.0 |
| Vb | 2.3 | 1.6 | 2.3 | 1.8 | 0.0 |

EXAMPLE 2

(d) A mixture weighing 100 grams was prepared from 60 parts of hydroxyl endblocked dimethylpolysiloxane (48,000 cp.), 30 parts trimethylsiloxy endblocked dimethylpolysiloxane (500 cp.), and 10 parts fume silica. The above mixture was further mixed with 0.4 gram N-beta-aminoethyl-gamma-aminopropyltrimethoxysilane and 4.5 grams of methyltris(cyclohexylamino)silane. (Material D.)

(e) The procedure described above in (d) was repeated except that 4.5 grams of the silane mixture described in (b) in Example 1 and 0.05 gram dibutyltindilaurate were used in place of the 4.5 grams of methyltris(cyclohexylamino)silane. (Material E.)

(f) For comparisons and as controls, the procedures described above under (d) and (e) were repeated except the 0.4 gram N-beta-aminoethyl-gamma-aminopropyltrimethoxysilane was omitted. (Materials Vd and Ve.)

The materials D, E, Vd and Ve were stored in water excluding packages and were found to be essentially unchanged after six months' storage. Each material vulcanized and cured to form an elastomer when exposed to atmospheric moisture at room temperature.

The adhesion of these materials to a variety of substrates was tested as in Example 1 with the following results:

| Material | Adhesion in kg./cm.² on— | | | | |
|---|---|---|---|---|---|
| | Stainless steel (V₂A) | Brass | Anodized aluminum | Steel sheet Cd coated | Polystyrene film |
| D | 8.5 | 3.4 | 8.3 | 3.9 | 3.5 |
| E | 8.5 | 3.0 | 7.9 | 3.7 | 3.3 |
| Vd | 2.6 | 1.2 | 2.5 | 1.8 | 0.0 |
| Ve | 2.4 | 1.4 | 2.1 | 2.0 | 0.0 |

From Examples 1 and 2, it becomes very apparent the addition of the silanes containing in each molecule at least one amino group bonded to silicon across carbon and at least one monovalent hydrocarbon, amino substituted hydrocarbon or alkoxy substituted hydrocarbon radical, such radicals optionally containing oxygen in the form of ether linkages, greatly improves the adhesion of the RTV silicone rubber stock to a variety of substrates. Such adhesion improvement can be extremely dramatic as in the case of solid polystyrene substrates where the prior art material does not adhere and the material of this invention adheres better than the prior art material does to steel, aluminum and brass.

EXAMPLE 3

Equivalent results were achieved when Example 1(a) was repeated employing in place of the CH₃Si{O(CH₂)₂NH₂}₂(CH₂)₃O(CH₂)₂NH₂ an equivalent amount of the following:

CH₃Si{(CH₂)₃O(CH₂)₂NH₂}₂O(CH₂)₂NH₂,
(CH₃O)₃Si(CH₂)₃NHCH₂CH₂NH₂,
H₂N(CH₂)₂O(CH₂)₃Si(OCH₂CH₂NH₂)₃,
H₂NCH₂CH₂O(CH₂)₃Si(OC₂H₅)₃,
H₂N(CH₂)₂NH(CH₂)₃Si(OC₂H₅)₃,
H₂N(CH₂)₂NH(CH₂)₄Si(OC₂H₅)(OCH₃)₂,
H₂N(CH₂)₃Si(OC₂H₅)₃,
(CH₃)HNCH₂CH₂Si(OCH₃)₂(OC₃H₇),
(CH₃)(C₂H₅)N(CH₂)₂N(CH₃)(CH₂)₃Si(OC₂H₅)₃,
(CH₃)HN(CH₂)₄Si(OC₂H₅)₃,
(H₂NCH₂CH₂)₃SiOCH₃,
H₂NCH₂CH₂(CH₃O)Si(CH₃)₂,
H₂NCH₂CH₂HNCH₂CH₂Si(OC₂H₅)₂C₆H₅,
and
H₂NCH₂Si(OCH₃)(OC₅H₁₁)C₁₂H₂₅.

That which is claimed is:

1. A room-temperature vulcanizable silicone rubber stock prepared and stored in the substantial absence of water and curable to an elastomer on exposure to water, said stock exhibiting excellent adhesion to substrates, consisting essentially of (1) an essentially linear diorganopolysiloxane having reactive endblockers, the organic substituents in said diorganopolysiloxane being at least 50 percent methyl groups and up to 50 percent of the organic substituents being selected from the group consisting of hydrocarbon radicals of 1 to 18 carbon atoms, halogenated hydrocarbon radicals of 1 to 18 carbon atoms and cyanohydrocarbon radicals of 1 to 18 carbon atoms, the reactive endblockers in said organopolysiloxane being selected from the group consisting of —OH, —NR″₂ where R″ is hydrogen or a hydrocarbon radical of 1 to 18 carbon atoms, an oxime radical, hydrogen, an alkoxy radical of 1 to 6 carbon atoms or an alkoxyalkoxy radical of 1 to 10 carbon atoms, said diorganopolysiloxane containing an average of from 3 to 2500 siloxane units per molecule, (2) crosslinking organosilicon compounds containing at least three functional groups per molecule, said functional groups being either all amino groups bonded to silicon through SiN linkage or a mixture of amino groups bonded to silicon through SiN linkage and oxime radicals, said mixture being (a) organosilicon compounds containing only said amino groups admixed with organosilicon compounds containing only said oxime groups, (b) organosilicon compounds containing both said amino groups and said oxime groups or (c) mixtures of (a) and (b), said organosilicon compound being a silane or a low molecular weight partial hydrolyzate thereof and being present in quantity sufficient to provide at least three of the defined hydrolyzable groups in (2) for each reactive endgroup in the diorganopolysiloxane (1), and (3) an organosilane additive containing in each molecule at least one amino group bonded to silicon through an SiC linkage, and at least one monovalent radical bonded to silicon through an SiO linkage and selected from hydrocarbon radicals of 1 to 18 carbon atoms, amino substituted hydrocarbon radicals of 1 to 18 carbon atoms, alkoxy substituted hydrocarbon radicals of 1 to 18 carbon atoms, and amino-alkoxy substituted hydrocarbon radicals containing 1 to 18 carbon atoms, and any of the foregoing hydrocarbon radicals containing oxygen in the form of ether (C—O—C) linkages, any remaining substituents being organic substituents as defined for the diorganopolysiloxanes (1) above, said organosilane additive being present in amounts of from 0.1 to 10 percent by weight based on the total weight of (1), (2) and (3).

2. The composition of claim 1 wherein the organosilane (3) is of the general formula $$\{R''_2N(CH_2)_mZ_n(CH_2)_p\}_aSi(OR')_bR_{4-a-b}$$

where each R is a hydrocarbon radical of 1 to 18 carbon atoms, a halogenated hydrocarbon radical of 1 to 18 carbon atoms or a cyanohydrocarbon radical of 1 to 18 carbon atoms, each R' is a monovalent hydrocarbon radical or a monovalent hydrocarbon radical containing oxygen in the form of C—O—C linkages and amino substituted, alkoxy substituted or amino-alkoxy substituted derivatives of said hydrocarbon radicals, each R″ is a hydrogen atom or a hydrocarbon radical of 1 to 18 carbon atoms, Z is oxygen or —NR″ where R″ is as above defined, a and b are each 1, 2 or 3, the sum of a+b is 2, 3 or 4, m is 1 to 10, n is 0 or 1 and p is 1 to 10.

3. The composition of claim 2 where m is 2 and p is 3.

4. The composition of claim 1 wherein the crosslinking organosilicon compounds (2) are selected from the group consisting of (a) silanes of the general formula $R_cSi(NR''_2)_{4-c}$ or partial hydrolyzates thereof, (b) mixtures of the silanes or partial hydrolyzates (a) with silanes of the general formula $R_cSi(ON=X)_{4-c}$ or partial hydrolyzates thereof, (c) silanes of the general formula $R_{4-d-e}Si(ON=X)_d(NR''_2)_e$ or partial hydrolyzates thereof or (d) mixtures of (a) and (c), mixtures of (b) and (c) or mixtures of (a), (b) and (c), in said general formulae each R is a hydrocarbon radical, halogenated hydrocarbon radical or cyanohydrocarbon radical of 1 to 18 carbon atoms, each R″ is H or a hydrocarbon radical of 1 to 18 carbon atoms, each X is =CH″₂ where R″ is as above defined or

where R^{iv} is a divalent hydrocarbon radical, c is 0 or 1, d is 1, 2 or 3, e is 1, 2 or 3 and d+e is 3 or 4.

5. The composition of claim 1 wherein the diorganopolysiloxane (1) has the general formula

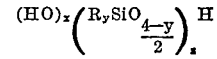

where at least 50 percent of the R groups are methyl radicals, and 0 to 50 percent of the R groups are monovalent radicals containing 1 to 18 carbon atoms selected from the group consisting of hydrocarbon radicals, halogenated hydrocarbon radicals and cyanohydrocarbon radicals, $x$ has an average value of 0.99 to 1.01, $y$ has an average value of 1.99 to 2.01, $x+y$ is 3.0 and $z$ is 3 to 2500.

6. The composition of claim 5 where 50 to 100 percent of the R groups are methyl radicals and 0 to 50 percent of the R groups are phenyl, vinyl or 3,3,3-trifluoropropyl radicals.

7. The composition of claim 1 wherein the diorganopolysiloxane (1) is a hydroxyl endblocked dimethylpolysiloxane or a hydroxyl endblocked copolymer of 98 to 99.9 mol percent dimethylsiloxane units and 0.1 to 2.0 mol percent vinylmethylsiloxane units and has a viscosity in the range from 100 to 500,000 cs. at 25° C.

8. The composition of claim 1 also containing (4) a filler.

9. The composition of claim 1 also containing (5) a crosslinking condensation catalyst.

10. The composition of claim 8 also containing a crosslinking condensation catalyst.

11. The composition of claim 7 also containing an organic peroxy compound.

References Cited

UNITED STATES PATENTS

| 3,280,072 | 10/1966 | Frankland | 260—46.5 |
| 3,464,951 | 9/1969 | Hittmair et al. | 260—37 |
| 3,560,442 | 2/1971 | Golitz et al. | 260—46.5 |
| 3,576,905 | 4/1971 | McKellar et al. | 260—825 |

DONALD E. CZAJA, Primary Examiner

M. I. MARQUIS, Assistant Examiner

U.S. Cl. X.R.

117—124 F, 125, 135.1, 138.8 A, 138.8 E, 148, 155; 252—63.7; 260—18 S, 37 SB, 46.5 E, 825, 827